(12) United States Patent
Vogel et al.

(10) Patent No.: US 7,266,866 B2
(45) Date of Patent: Sep. 11, 2007

(54) MEMORIAL CREATED FOR CREMATION REMAINS AND PROCESSES FOR MAKING SAME

(76) Inventors: Harold C. Vogel, 76 S. Beverly Dr., Brick, NJ (US) 08724; Gregory W. Young, 361 Drum Poin Rd., Brick, NJ (US) 08723; Tracy M. Crapser, 815 Huntington Ave., Pine Beach, NJ (US) 08741

( * ) Notice: Subject to any disclaimer, the term of this patent is extended or adjusted under 35 U.S.C. 154(b) by 514 days.

(21) Appl. No.: 10/679,229

(22) Filed: Oct. 3, 2003

(65) Prior Publication Data
US 2005/0071964 A1 Apr. 7, 2005

Related U.S. Application Data

(60) Provisional application No. 60/416,449, filed on Oct. 7, 2002.

(51) Int. Cl.
*A61G 17/00* (2006.01)
(52) U.S. Cl. .................. 27/1; 110/341; 428/542.4; 428/3
(58) Field of Classification Search ............ 27/1; 110/341; 428/3, 542.4
See application file for complete search history.

(56) References Cited

U.S. PATENT DOCUMENTS

| 6,382,111 | B1 * | 5/2002 | Hojaji ................. 110/341 |
| 6,615,463 | B1 * | 9/2003 | Hojaji ..................... 27/1 |
| 2002/0025392 | A1 * | 2/2002 | Yardley et al. ............ 428/3 |
| 2003/0154581 | A1 * | 8/2003 | Jain et al. .................. 27/1 |

* cited by examiner

*Primary Examiner*—William L. Miller
(74) *Attorney, Agent, or Firm*—Clifford G. Frayne

(57) ABSTRACT

A memorial for deceased humans or animals in which the cremated residue or ash is blended or mixed with particulate glass, the mixture being heated to form a liquid pool of glass with the cremation residue or ash dispersed, infused and/or absorbed therein, the molten glass and ash being removed from the heat source after a suitable time period and transferred to a mold in the shape of the memorial, the mold allowed to cool until the memorial sets, the memorial then removed from the mold and reheated in an annealing oven at a suitable temperature for a suitable time so as to eliminate possible cracking and scoring, the memorial once removed from the annealing oven can be further cut, polished, faceted, engraved or the like. The initial mixture of particulate glass and cremation residue and ash can be further combined with a coloring agent if so desired before heating or before transfer to the memorial mold.

10 Claims, No Drawings

MEMORIAL CREATED FOR CREMATION REMAINS AND PROCESSES FOR MAKING SAME

RELATED APPLICATIONS

Applicant claims the benefit of provisional application Ser. No. 60/416,449, filed Oct. 7, 2002.

BACKGROUND OF THE INVENTION

1. Field of the Invention

The instant invention relates to a memorial for deceased humans or animals, the method of forming the memorial fixes the cremation remains in a permanent medium.

2. Description of the Prior Art

Cremation has been used world wide for many centuries by many societies. The method has been chosen over burial either because of religious reasons or convenience. The body is reduced in mass to what is commonly referred to as ashes, which can last indefinitely as it is primarily inorganic matter. The "ashes" are composed of primarily bone ash.

Traditionally ashes from cremation have been stored in closed containers or urns. In some instances it is the desire of the deceased to have his ashes spread upon a particular location. When an urn is utilized to store cremation remains, the urn is normally kept in a safe, secure location to avoid its overturning and spillage. Many individuals with human cremated remains, and pet owners who have become particularly attached to their pet, would prefer to have the cremation remains memorialized in a more permanent medium so that it could be displayed without fear of breakage or spillage. These containers do not allow the cremated remains to be viewed without being taken from the container or the container opened. Applicant's memorial would allow for display.

OBJECTS OF THE INVENTION

It is an object of the present invention to provide for a novel method to convert the ashes or other cremation remains of a human or animal into a solid and durable fixed medium.

It is another object of the present invention to provide for a novel formulation for a fixed medium, including and incorporating cremation residue.

SUMMARY OF THE INVENTION

A memorial for deceased humans or animals in which the cremated residue or ash is blended or mixed with particulate glass, the mixture being heated to form a liquid pool of glass with the cremation residue or ash dispersed, infused and/or absorbed therein, the molten glass and ash being removed from the heat source after a suitable time period and transferred to a mold in the shape of the memorial, the mold allowed to cool until the memorial sets, the memorial then removed from the mold and reheated in an annealing oven at a suitable temperature for a suitable time so as to eliminate possible cracking and scoring, the memorial once removed from the annealing oven can be further cut, polished, faceted, engraved and the like. The initial mixture of particulate glass and cremation residue and ash can be further combined with a coloring agent if so desired before heating or before transfer to the memorial mold.

DETAILED DESCRIPTION OF THE INVENTION

The cremated remains or residue are gathered together and examined for particle size. If large pieces of residue such as bone are present, the cremated remains or residue is either ground to a particle size consistency equivalent to that of coffee grindings, or the larger particles are mechanically extracted from the residue, mechanically crushed and then ground to the desired consistency. Preferably usable ash must pass through a screen mesh of no larger than 0.020 mesh. In certain instances, the cremated remains or residue will be examined by passing a magnet over the residue to extract any foreign metals. Once the cremated remains or residue exists in a homogeneous particle size, that portion or amount to be used for the memorial is positioned in a sealed container with ground glass and shaken until a homogeneous mixing of the glass particulate and cremated remains or residue is achieved.

Applicant's process does not treat the cremation remains or residue to remove any impurities from within the bone or ash as taught by the prior art. Further, the Applicant's process does not reheat the cremation remains or residue. Applicant's process maintains the impurities that accumulated during the life of the animal and human and that were left after the cremation process. The amount of cremation remains or residue utilized in making the memorial depends upon the size of the memorial and the size of the animal. The amount of cremated remains used is a function of the size of the product, not the size of the animal. In the case of small animals, all of the cremated remains may be used in the creation process and in the case of larger animals, only a portion of the amount of cremated remains will be utilized. Still further, depending upon the desires of the client, the process can control the visibility of the cremated remains within the memorial by varying the size and/or volume of the cremation remains or residue.

The process uses an over the counter, commonly sold glass commonly referred to as "art glass", available in either clear transparent or a wide range of colors. The preferred mesh size would be 0.062 mils. However, Applicant has performed the process using sheet glass, which is ground up, or preground sheet glass available in four consistencies, fine, course, medium, and powder or cullet. Chunks or sheets of glass may be used without grinding to achieve desired affects.

The percentage of cremated remains to ground glass can vary from between 1% to 40% of the total mix by weight. If color is desired, colored glass can be substituted for a portion of the clear glass, keeping the percentage of cremation remains to ground glass the same. This colored glass can be added and mixed homogeneously with the clear glass and the cremated remains or residue, or this colored glass can be positioned at a particular location in the crucible to impart a color at a particular location in the finished product. As an alternative to colored glass, coloring agents may also be substituted, as may any decorative glass additive.

The homogeneous mixture is then placed into a crucible of the appropriate size for the volume of the finished form which is desired. The crucibles can vary in size and can be formed of any material that will not leach into the glass when the crucible and glass are subjected to heat. Once the glass and cremation remains or residue are positioned in the crucible, the crucible is placed in a cool oven and ramped up to 2,200° F. or placed in an oven preheated to 2,200° F. and maintained at 2,200° F. for a minimum period of two hours. This two hour period is often referred to in the trade as "soak time". The two hour soak time will yield a suitable molten or liquid mix of glass and cremated remains. If one desires a finished product with less visible cremated remains, then the soak time may be increased to as high as twelve hours. The minimum, however, is a two hour soak time at a constant temperature of 2,200° F. This minimum soak time is suitable for crucibles and contents up to 30 grams. Crucibles and contents over 30 grams require longer soak times as the volume increases. Once the required soak time has been achieved, the crucible would be removed from the oven and its liquid contents poured into a mold. However, it should be pointed out that it is possible to substitute the mold for the crucible and have the glass and cremated remains and residue melted in the oven as described heretofore with the mold being removed and allowed to cool. Alternatively, the crucibles may be placed in a preheated oven and the oven left to recover from loss of heat and returned to 2,200° F.

After a minimum two hour soak time at 2,200° F., the contents of the crucibles will become viscus and pourable. In the preferred embodiment, the crucible is then removed from the oven and poured into a mold of the desired design of the memorial product. The molds are constructed of various grades of steel, other suitable metals, graphite, clay or ceramic. In order to achieve a smooth exterior surface, the molds can be preheated. If a textured finish is desired, the mold is left at room temperature. Still further, after the contents are poured into the mold, a torch may be used to apply heat to the upper surface to polish that surface as it cools. Another alternative is, after the memorial is released from the mold, it could be placed back in the oven and the temperature brought to just the slumping point, approximate 1,500° F. for a few minutes then placed in the annealing oven. This procedure is called "fire polishing".

Alternatively, the crucible could be removed from the oven and as it cooled, the contents could be slumped mechanically using a stainless steel rod or other suitable device and dropped or pressed into the mold, as opposed to pouring.

As the mold cools, and the contents have cooled sufficiently to maintain a shape outside of the mold, the contents are removed from the mold and quickly placed in an annealing oven on ceramic shelves set at 1,000° F. The annealing process is carried out in order to let the surface of the product or design flow and smooth out, and it is necessary to eliminate possible cracking and scoring after cooling. The exact temperature of the annealing technique is dependent upon the type of glass which is used. The annealing temperature is no greater than 1,000° F. When the annealing oven is ready to be cooled, it initially ramps down from its highest temperature to 850° F. At 850° F. it then ramps down to 750° F. at the rate of approximately 18°-20° F. per hour. When the 750° F. temperature has been reached, the oven shuts off and gradually cools at a faster rate than 18° F. per hour until the product is tolerable to touching with bare skin. Designs of up to 50 grams can be annealed in as little as 12 hours, and larger designs will take longer and possibly significantly longer, depending upon the thickness. Once the design has been removed from the annealing oven, it can be further cut, polished, faceted, laser engraved, sand blasted, mechanically engraved, left to stand alone, mounted on a plaque, displayed in a box, interred in a columbarium, buried, or formed into a piece of jewelry.

The item can be carbide or diamond drilled to create a pocket to add additional cold remains, such as a locket of hair or other desirable items into the finished product and then resealed.

Applicant's process controls the appearance of the finished product which is cast, cut, molded or worked by hand into any desired shape. Depending upon the glass used, the particle size of the cremation remains or residue and the ratio of cremation remains or residue to glass, the finished product may be clear in color with specks of particulate matter appearing in random patterns free floating within the crystal, black specks may appear, and the cremated remains or residue can appear in any color from white to black at the conclusion of the process with white to gray being the most common. If clear, uncolored glass is used, it can take on color as a result of being mixed with cremated remains, the color ranging from very light aqua/green to dark amber to dark green and be either opaque or translucent.

The shape of the finished product may be utilitarian in nature in the form of a piece of jewelry, a vase, bowl, vessel, table top displays, wall hangings, or a sculpture, or other art form, such as a touch stone or a paper weight. The shape may be created by melting glass crystal and infusing the cremated remains and then pouring into molds or melting and slumping into molds, mechanical pressure being applied to the product in the mold in either process. Alternatively, the shape may be created by casting a piece larger than the finished product and cutting or faceting it after cooling. Still further, the shape may be created by "gathering" or inserting a metal rod into the molten batch of glass crystal, extracting or gathering glass onto the rod from the batch, and rolling the glass onto cremated remains. In this method the glass and the cremated remains are worked by hand until the cremated remains are disbursed in a desired pattern. Additional glass is added by reinserting the metal rod with the glass and cremated remains into the batch. Coloring can be achieved by the process heretofore described, or can be introduced by working colored glass into the glass gathered on the rod, or can be mixed with the cremated remains prior to rolling the glass on the rod into the cremated remains. The glass gathered on the rod can then be worked by hand or slumped into a mold in order to achieve the desired shape. Additionally, cremated remains may be placed between layers of slumping glass. In this application, the glass does not take on color as it does not mix with the cremated remains.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

We claim:

1. A memorial product created for the cremation remains of a human or animal consisting of a mixture of bone ash of the deceased human or animal, ground art glass or ground sheet glass, and a colorant additive.

2. The memorial product in accordance with claim 1 wherein said ground art glass or said ground sheet glass can be colored or transparent.

3. The memorial in accordance with claim 1 wherein the bone ash is in a particulate size of no greater than 0.020 mesh.

4. The memorial product in accordance with claim 1 wherein said ground art glass or said ground sheet glass is present in a particulate size of 0.062 mils.

5. The memorial product in accordance with claim 1 wherein the bone ash is present with said ground art glass or said ground sheet glass in an amount no greater than 40% by weight.

6. A memorial product containing the cremation remains of a human or animal, said memorial product consisting of a mixture of bone ash of the deceased human or animal, ground art glass or ground sheet glass, and a colorant additive said mixture of bone ash, ground art glass or ground sheet glass, and colorant additive being heated to form a glass melt, said glass melt being poured into a mold and hardened into a predetermined glass form.

7. The memorial product in accordance with claim 6 wherein said ground art glass or said ground sheet glass can be colored or transparent.

8. The memorial in accordance with claim 6 wherein said bone ash is in a particulate size of no greater than 0.020 mesh.

9. The memorial product in accordance with claim 6 wherein said ground art glass or said ground sheet glass is present in a particulate size of 0.062 mils.

10. The memorial product in accordance with claim 6 wherein said bone ash is present with said ground art glass or said ground sheet glass in an amount no greater than 40% by weight.

* * * * *